Jan. 28, 1958     G. BLICKENSTORFER     2,821,098
CUTTING TOOL
Filed Nov. 27, 1953
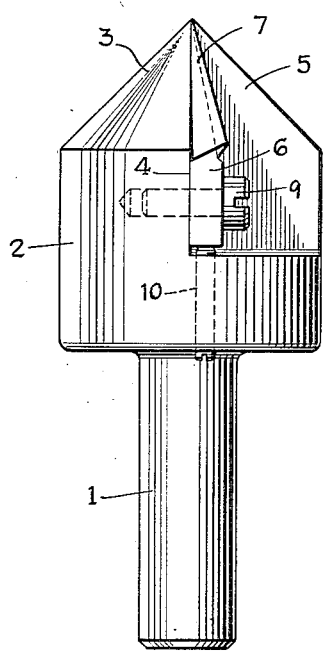
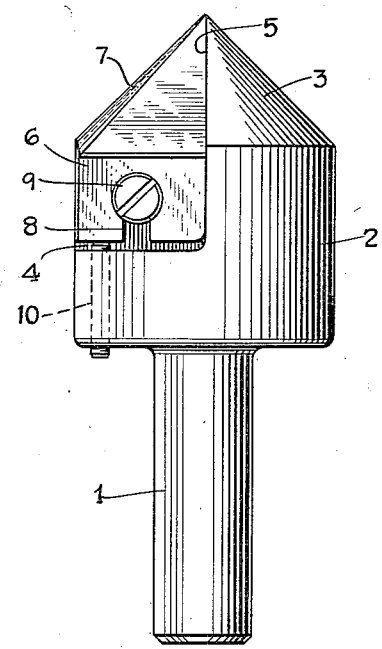
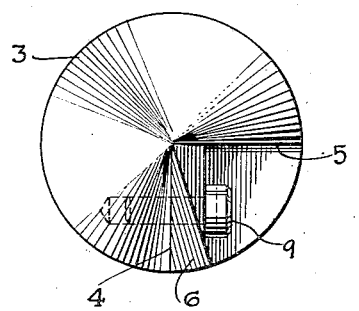
INVENTOR.
GUSTAV BLICKENSTORFER.
BY
ATTORNEY.

United States Patent Office 2,821,098
Patented Jan. 28, 1958

2,821,098

CUTTING TOOL

Gustav Blickenstorfer, Uster, Switzerland

Application November 27, 1953, Serial No. 394,845

Claims priority, application Switzerland
November 29, 1952

4 Claims. (Cl. 77—73.5)

Most conventional conical cutting tools are in the form of a conical star wheel whose edges serve as cutting edges. The generally known disadvantages of cutting tools of this type are the unfavorable cutting angle, rapid wear necessitating replacement of the whole tool, and particularly the bad guidance because the cutting edges serve also as guide edges.

To avoid replacement of the complete tool when the tool is worn, it has been proposed to interchangeably mount a cutting knife in a diametrical slot of a conical guide head. This arrangement, however, was also unsatisfactory because of bad guidance due to the diametrically opposed cutting edges projecting from the guide head.

A cutting tool has recently been proposed whose head consists of a semicone whose generatrices serve as cutting edges. This tool is also characterized by unsatisfactory guidance and a short life because there are no interchangeable knives and the guide surface which initially encompasses an angle at center of 180° becomes smaller at each regrinding.

The cutting tool according to the invention avoids the aforedescribed disadvantages. It differs from conventional devices by the provision of a conical guide head and a sector-shaped recess or cut-out in the latter whose angle at center is smaller than 180°, a cutting knife being interchangeably and adjustably mounted in the recess.

The accompanying drawing illustrates a preferred modification of a cutting tool according to the invention.

Fig. 1 is an elevation of the cutting tool;

Fig. 2 is an elevation of the cutting tool turned 90° relatively to the showing of Fig. 1;

Fig. 3 is a top view of the cutting tool according to Figs. 1 and 2.

Referring more particularly to the drawing, the cutting tool comprises a shaft 1, a cylindrical portion 2, and a conical head portion 3 placed on top of the cylindrical portion 2. A quadrant is cut out of the head portion 3 and of a part of the cylindrical portion 2 so that two axial plain surfaces 4 and 5 are formed which are disposed at a right angle to each other. A cutting knife 6 having a hollow ground cutting edge 7 whose inclination corresponds to that of the generatrix of the cone forming the head portion 3, is interchangeably mounted by means of a screw 9 to the surface 4, the screw extending through a slot 8 in the cutting knife. An adjusting screw 10 inserted in a threaded bore in the cylindrical part 2 abuts against the bottom surface of the cutting knife 6 and affords adjustment of the position of the latter. Depending on the pitch of the thread of the screw 10, the adjustment can be very accurate, the axial movement of the cutting knife being guided by the surfaces 4 and 5.

Because of the large guide surface provided by the guide head which surface encompasses an angle at center of more than 180°, an extraordinary good guidance is assured. The guide surface of the illustrated embodiment of the invention amounts to three quarters of the circumference of the guide head. Due to the arrangement of a single knife, rattling and inaccuracies caused thereby are avoided which is unavoidable with cutting tools having more than one knife, because exact adjustment of a plurality of knives is not possible. Since the cutting knife of the tool according to the invention can easily be replaced by loosening a single screw and since the tool is easily adjusted by means of an adjusting screw, a single tool is provided which affords a more exact and a better operation than the complicated conventional devices.

What is claimed is:

1. A cutting tool comprising a head having a cylindrical portion and a conical portion coaxially extending from said cylindrical portion, a single sector-shaped cut-out in said conical portion and in a part of said cylindrical portion adjacent to said conical portion, leaving a solid cylindrical base portion, said cut-out having two plane radial walls extending from the rotation axis of the cutting tool and being positioned at an angle which is smaller than 180°, and a cutting knife removably and axially adjustably mounted on one of the radial walls of said cut-out.

2. A cutting tool as defined in claim 1, the angle at center of said single sector shaped cut-out being substantially 90°.

3. A cutting tool comprising a head having a cylindrical portion and a conical portion coaxially extending from said cylindrical portion, a single sector-shaped cut-out in said conical portion and in a part of said cylindrical portion adjacent to said conical portion, leaving a solid cylindrical base portion, said cut-out having two plane radial walls extending from the rotation axis of the cutting tool and being positioned at an angle which is smaller than 180°, a cutting knife member removably and axially adjustably mounted on one of said radial walls, said cutting knife member having a straight axial guide surface extending over the whole length of said member, the whole length of said guide surface abutting against the other of said radial walls at all operating positions of said knife member, and an adjusting screw screwed into and extending through said solid cylindrical base portion parallel to the rotation axis of the cutting tool, said adjusting screw having an end abutting against said knife member for defining the axial position of said knife member relatively to said head.

4. A cutting tool comprising a head having a cylindrical portion and a conical portion coaxially extending from said cylindrical portion, a single sector-shaped cutout in said conical portion and in a part of said cylindrical portion adjacent to said conical portion, leaving a solid cylindrical base portion, said cut-out having two plane radial walls extending from the rotation axis of the cutting tool and being positioned at an angle which is smaller than 180°, and a cutting knife removably and axially adjustably mounted on one of the radial walls of said cut-out, said cutting knife having a cutting edge substantially parallel to a generatrix of said conical portion and having a point substantially coinciding with the point of said conical portion.

References Cited in the file of this patent

UNITED STATES PATENTS

| | | |
|---|---|---|
| 422,607 | Moss et al. | Mar. 4, 1890 |
| 806,011 | Smart | Nov. 28, 1905 |
| 1,346,105 | Bosse | July 13, 1920 |
| 2,358,608 | Turner | Sept. 19, 1944 |